United States Patent

[11] 3,614,123

| | | |
|---|---|---|
| [72] | Inventor | John E. Raidel<br>Springfield, Mo. |
| [21] | Appl. No. | 866,203 |
| [22] | Filed | Oct. 14, 1969 |
| [45] | Patented | Oct. 19, 1971 |
| [73] | Assignee | Ridewell Corporation<br>Springfield, Mo. |

[54] TRAILING AXLE SUSPENSION
12 Claims, 10 Drawing Figs.

[52] U.S. Cl. .................................................... 280/104.5, 267/52
[51] Int. Cl. ........................................................ B60g 5/04
[50] Field of Search ........................................... 280/104.5; 267/52

[56] References Cited
UNITED STATES PATENTS

| 1,757,759 | 5/1930 | Van Leuven | 280/104.5 |
| 2,493,024 | 1/1950 | Pointer | 280/104.5 |
| 3,499,660 | 3/1970 | Raidel | 280/104.5 |

Primary Examiner—Philip Goodman
Attorney—Kingsland, Rogers, Ezell, Eilers & Robbins ABSTRACT: A suspension assembly for a vehicle having front and rear axles. Front and rear hanger assemblies depending from the vehicle chassis. A free-floating shackle assembly between the axles. A front leaf spring extending between the front hanger assembly and the shackle assembly and bearing downwardly on the front axle. A rear leaf spring extending between the shackle assembly and the rear axle and bearing upwardly against a bearing in the rear hanger assembly. The rear leaf spring bears downwardly against the rear axle.

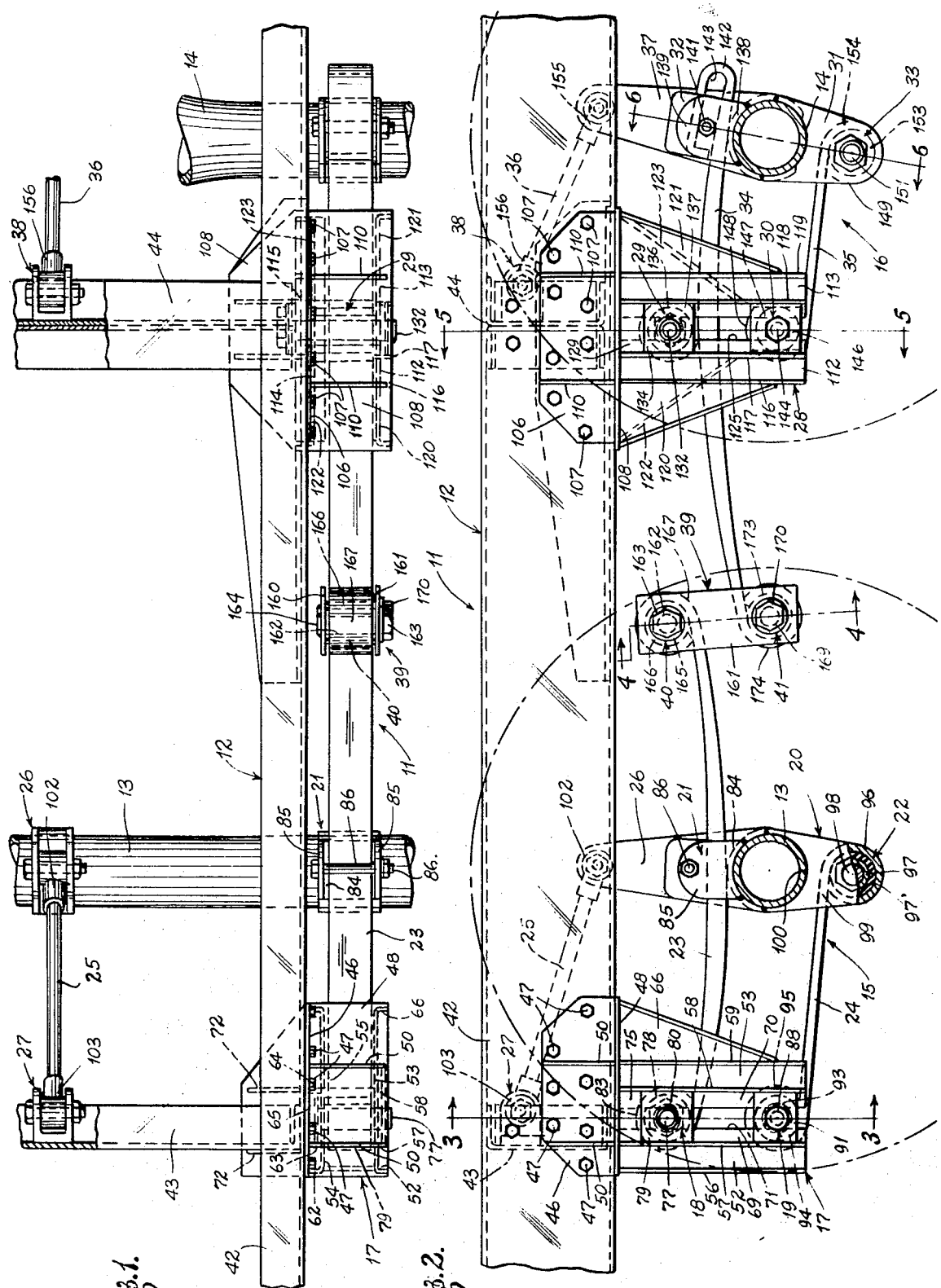

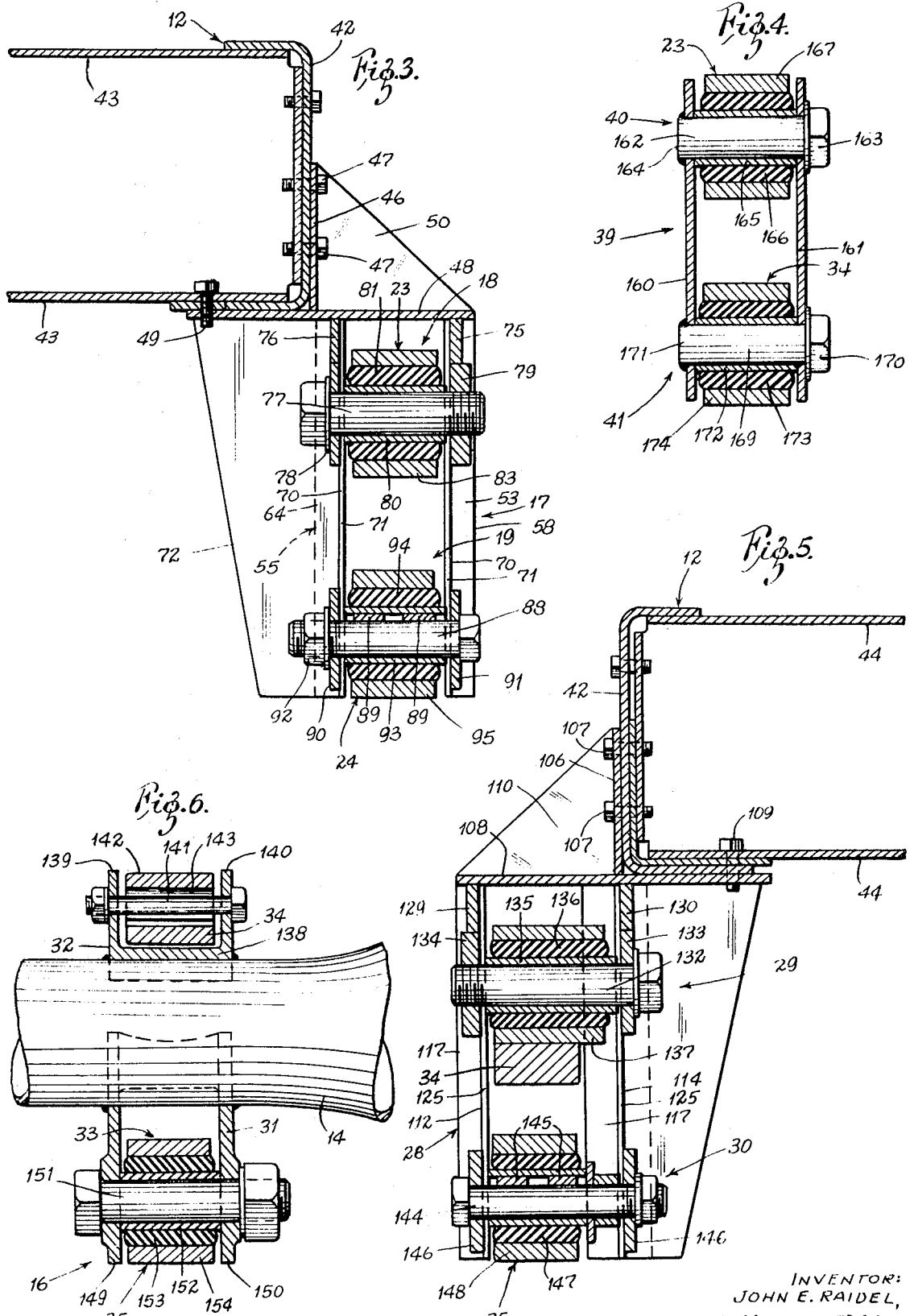

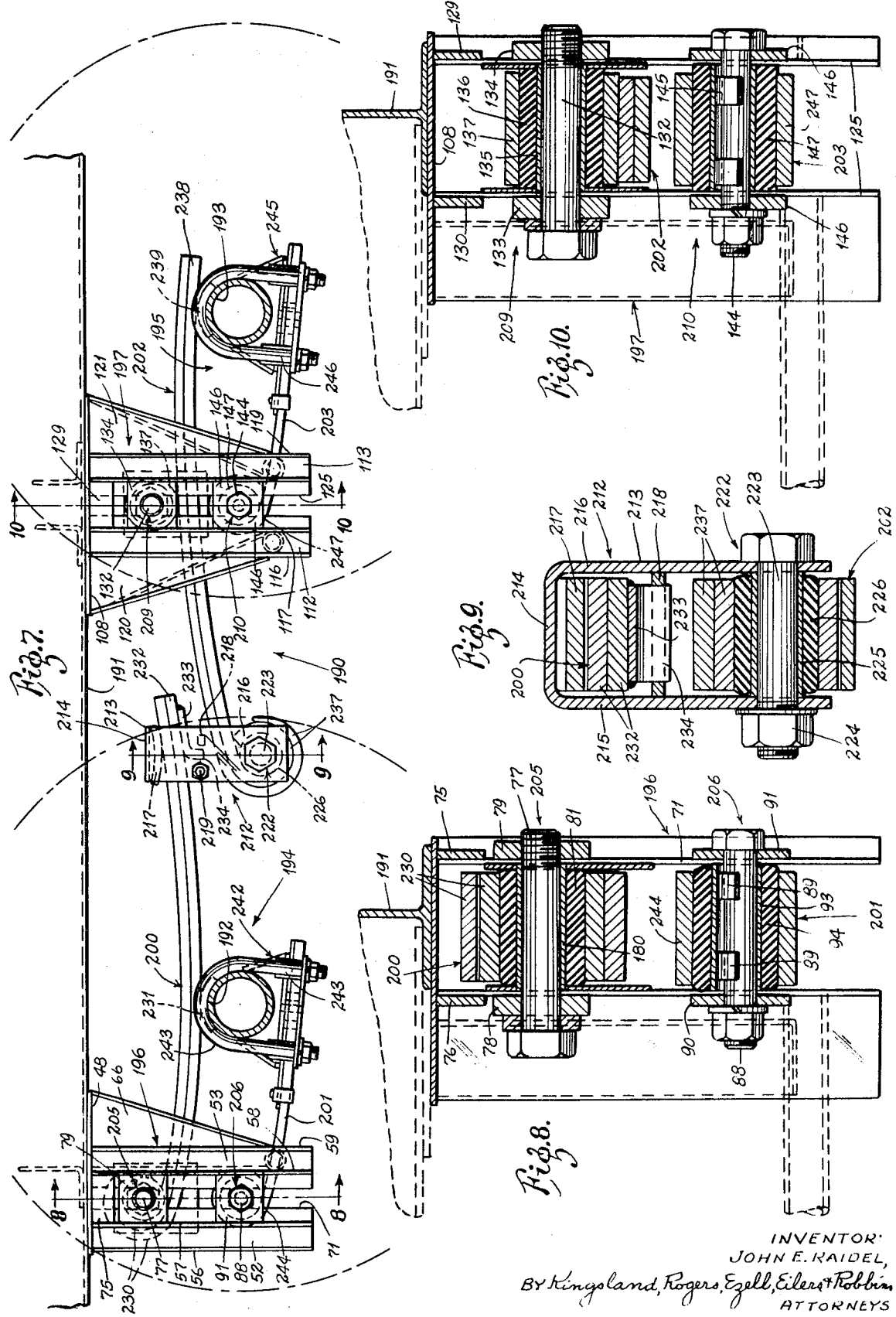

TRAILING AXLE SUSPENSION

BRIEF DESCRIPTION OF THE INVENTION

This suspension assembly is for a vehicle that has front and rear axles. A front hanger assembly projects downwardly from the vehicle chassis forward of the front axle and a rear hanger assembly projects downwardly from the vehicle chassis forward of the rear axle. A front leaf spring is pivotally connected to a bearing supported by the front hanger assembly and, in one embodiment, to a bearing supported by the shackle assembly. The center of the front leaf spring bears downwardly against the front axle. A rear leaf spring is pivotally connected to the shackle and, at its rear end, bears downwardly against the rear axle. The center of the rear leaf spring bears upwardly against a bearing that is supported by the rear hanger assembly.

A pull rod is connected between the front axle and the front hanger assembly. Similarly, a pull rod is connected between the rear axle and the rear hanger assembly. In one embodiment, a torque rod is pivotally connected between the chassis and a bracket that is affixed to the center of the front axle, and a torque rod is pivotally connected between the chassis and a bracket that is affixed to the center of the rear axle. The torque rods are substantially parallel to the pull rods to minimize axle rotation.

In both embodiments, the various components are mounted on rubber bushing assemblies. These rubber bushing assemblies are vertically adjustable in the hanger assemblies to accommodate different axle heights. Also, certain ones of the bearing assemblies contain eccentric cams that can be rotated for axle alignment.

BRIEF DESCRIPTION OF THE DRAWINGS

FIG. 1 is a top plan view of the trailing suspension assembly;

FIG. 2 is a side elevation view of the trailing suspension assembly;

FIG. 3 is a view in section taken along the line 3—3 of FIG. 2, but on an enlarged scale;

FIG. 4 is an enlarged view in section taken along the line 4—4 of FIG. 2;

FIG. 5 is an enlarged view in section taken long the line 5—5 of FIG. 2;

FIG. 6 is a enlarged view in section taken along the line 6—6 of FIG. 2;

FIG. 7 is a side elevation view of a modified form of the trailing suspension assembly;

FIG. 8 is an enlarged view in section taken along the line 8—8 of FIG. 7;

FIG. 9 is an enlarged view in section taken along the line 9—9 of FIG. 7; and

FIG. 10 is an enlarged view in section taken along the line 10—10 of FIG. 7.

This suspension assembly 11 is designed for installation between the chassis 12 of a vehicle and its front and rear axles 13 and 14. Obviously, although a suspension assembly 11 for one side of the vehicle is shown, an identical suspension assembly would be installed on the opposite side of the vehicle. The suspension assembly includes a front axle subassembly 15 and a rear axle subassembly 16. As will be described in more detail hereinafter, the front axle subassembly has a hanger assembly 17 that is connected to and depends below the vehicle chassis 12. The hanger assembly 17 supports two bushing assemblies 18 and 19. An axle seat 20 is welded to the underside of the front axle 13, and a spring guide 21 is welded to the upper side of the front axle. The axle seat 20 supports a bushing assembly 22 below the front axle.

A leaf spring 23 is slidable in the spring guide 21 and bears down against the front axle 13. One end of the leaf spring 23 is journaled to the bushing assembly 18. A flat rod 24 is connected between the lower bushing assembly 19 on the hanger assembly 17 and the bushing assembly 22 on the lower end of the axle seat 20.

At the center of the front axle 13, a radius rod 25 has pivoted end connections to an axle bracket 26 that is welded to the upper side of the front axle 13 and a chassis bracket 27 that is welded to the chassis. The radius rod 25 is substantially parallel to the flat rod 24.

The rear axle subassembly 16 has a hanger assembly 28 that is connected to and depends below the chassis 12. The hanger assembly 28 supports two bushing assemblies 29 and 30. An axle seat 31 is welded to the underside of the rear axle 14, and a spring retainer 32 is welded to the upper side of the rear axle. The axle seat 31 supports a bushing assembly 33 below the rear axle 14.

A leaf spring 34 bears upwardly against the bushing assembly 29 near the center of the leaf spring. The rear end of the leaf spring 34 is adjustably clamped to the spring clamp 32. A flat rod 35 is connected between the bushing assembly 30 an the bushing assembly 33.

A radius rod 36 has pivoted end connections to an axle bracket 37 that is welded to the upper side of the rear axle 14 and a chassis bracket 38 that is welded to the vehicle chassis. The radius rod 36 is substantially parallel to the flat rod 35.

A shackle assembly 39 supports vertically spaced bushing assemblies 40 and 41. The rear end of the front leaf spring 23 is journaled to the upper bushing assembly 40. The front end of the rear leaf spring 34 is journaled to the lower bushing assembly 41.

The foregoing general components of the suspension assembly 11 will now be described in more detail. Referring to FIGS. 1 and 2, the trailing suspension assembly 11 is supported from a vehicle chassis 12. The chassis 12 includes (on the side shown) a side rail 42 and crossbeams 43 and 44.

In the front subassembly 15, the hanger assembly 17 comprises a gusset plate 46 fastened to the side frame member 42 by a plurality of bolts 47. As shown in FIG. 3, a horizontal plate 48 is welded to the vertical plate 42 and is fastened by bolts 49 to the crossbeam 43. Reinforcing webs 50 are welded to the vertical and horizontal plates 46 and 48.

Four downwardly extending rails 52, 53, 54, and 55 are welded to the horizontal plate 48. The hanger rail 52 has vertical flanges 56 and 57. The hanger rail 53 has vertical flanges 58 and 59 and a flanged triangular reinforcing plate 60 welded to its edge and to the horizontal plate 48. The hanger rail 54 has vertical flanges 62 and 63. The hanger rail 55 has vertical flanges 64 and 65, and also has a flanged triangular reinforcing plate 66 welded to its edge and to the horizontal plate 48.

The rails 52 and 53 have webs 69 and 70, respectively, extending toward one another from the flanges 57 and 58, with their opposing edges defining a vertical slot 71. Similar webs defining a similar oppositely positioned vertical slot are present on the rails 54 and 55. The rails 52 and 53 are reinforced by gusset plates 72 welded to them and to the horizontal plate 48.

A spacer block 75 is welded to the rails 52 and 53 between the flanges 69 and 70. A similar spacer block 76 is welded to the rails 54 and 55 between the flanges 63 and 64. The bearing assembly 18 is positioned below the spacer blocks 75 and 76. The bearing assembly 18 comprises a bolt 77 that is tightened against a lock washer 78 and extends through the slots 71 between the vertical rails 52 and 53 and the vertical rails 54 and 55. The bolt 77 is threaded into a square clamping plate 79 positioned to bear between the flanges 57 and 58 to prevent it from rotating while permitting it to slide vertically. A metal sleeve 80 surrounds and is rotatable about the bolt 77. A rubber bushing 81 surrounds and is bonded to the metal sleeve 80.

The leaf spring 23 has an end 83 curved tightly around the rubber bushing 81. The central portion of the spring 23 rests against the base 84 of the spring guide 21 that is welded to the front axle 13. The spring guide 21 has upwardly extending sides 85 with a bolt 86 extending between them and spaced above the spring 23. The sides 85 and bolt 86 provide lateral and upper limits to movement of the spring 23, but do not interfere with longitudinal sliding movement of the spring 23 across the base 84 of the spring guide 21.

The lower bushing assembly 19 that is mounted in the hanger assembly 17 includes a bolt 88 having eccentric cams 89 on one side. The bolt 88 is tightened against a pair of square plates 90 and 91 by a nut 92. The plates 90 and 91 are slidable between the flanges 57, 58, 63 and 64. A metal sleeve 93 is rotatably mounted on the bolt 88 and surrounds the eccentric cams 89. A rubber bushing 94 surrounds and is bonded to the metal sleeve 93.

One end 95 of the flat rod 24 is wrapped tightly about the rubber bushing 94. The other end 96 of the flat rod 24 is journaled about the bearing assembly 22. The bearing assembly 22 includes a rubber bushing 97' that is bonded to a metal sleeve 97. The metal sleeve 97 is rotatably journaled on a bolt 98 that extends through the spaced-side flanges 99 of the axle seat 20. The axle seat 20 has a cupped upper end 100 where it is welded to the front axle 13.

The axle bracket 26 is welded to the center of the front axle 13 and projects upwardly. One end 102 of the radius rod 25 is pivotally connected to the upper end of the axle bracket 26. The other end 103 of the radius rod 25 is pivotally connected to the bracket 27 that is welded to one of the chassis crossmembers 43.

The hanger assembly 17 positions the bearing assemblies 18 and 19 generally in a vertical line below the bracket 27. This vertical line is substantially parallel to the vertical line between the end 102 of the radius rod 25, the front axle 13, and the bearing assembly 22. These substantially parallel vertical lines combine with the radius rod 25 and the flat rod 24 to define a substantial parallelogram that restricts axle rotation.

In the rear subassembly 16, the hanger assembly 28 comprises a gusset plate 106 fastened to the side frame member 42 by bolts 107. A horizontal plate 108 is welded to the vertical gusset plate 106 and is fastened by bolts 109 to the crossbeam 44. Reinforcing webs 110 are welded to the vertical and horizontal plates 106 and 108.

Four downwardly extending rails 112, 113, 114, and 115 are welded to the horizontal plate 108. The rails 112, 113, 114 and 115 are similar to the rails 52, 53, 54 and 55, the rail 112 having vertical flanges 116 and 117, the rail 113 having vertical flanges 118 and 119, and the rails 114 and 115 having similar, oppositely directed, vertical flanges. There are flanged triangular reinforcing plates 120, 121, 122 and 123 welded to the edges of the rails 112, 113, 114 and 115, respectively, and to the horizontal plate 108. There is a vertical slot 125 between the rails 112 and 113 and similarly between the rails 114 and 115.

A spacer block 129 is welded to the rails 112 and 113 and a similar spacer block 130 is welded to the rails 114 and 115. The bearing assembly 29 is positioned below the spacer blocks 129 and 130.

The bearing assembly 29 comprises a bolt 132 tightened against a square block 133 and threaded into another square block 134. The flanges 117 and 118 permit the block 134 to slide but prevent it from rotating. The bolt extends within the slots 125. A metal sleeve 135 is rotatably mounted on the bolt 132. A rubber bushing 136 surrounds and is bonded to the sleeve 135. Another sleeve 137 is bonded to the rubber bushing 136.

As shown in FIG. 6, the spring retainer 32 has a base 138 welded to the rear axle 14 and has upwardly extending side flanges 139 and 140 through which a bolt 141 extends. One end 142 of the leaf spring 34 is bent back to form a slightly arcuate closed slot 143. The bolt 141 projects through the slot 143, permitting the leaf spring 34 to slide relative to the rear axle 14. Near its center, the leaf spring 34 bears upwardly against the metal sleeve 137 of the bushing assembly 29.

As shown in FIG. 5, the lower bushing assembly 30 comprises a bolt 144 having eccentric cams 145 on one side. The bolt 144 is tightened by a nut against a pair of square plates 146 that are slidable between the vertical flanges on the rails 112, 113, 114 and 115. A metal sleeve is rotatably mounted on the bolt 144 and its cams 145. A rubber bushing 147 surrounds and is bonded to the metal sleeve. One end 148 of the flat rod 35 is wrapped tightly about the rubber bushing 147.

The bushing assembly 33 and the axle seat 31 are identical to the bushing assembly 22 and axle seat 20. As shown in FIG. 6, the axle seat 31 is welded to the rear axle 14 and has two downwardly projecting side plates 149 and 150. The bushing assembly 33 includes a bolt 151 that is mounted between the side plates 149 and 150. A metal sleeve 152 rotatably surrounds the bolt 151, and a rubber bushing 153 surrounds and is bonded to the metal sleeve 152. The rearward end 154 of the flat rod 35 is tightly wrapped about the rubber bushing 153.

The rear axle bracket 37 is welded to the center of the rear axle 14 and projects upwardly. One end 155 of the radius rod 36 is pivotally connected to the upper end of the axle bracket 37. The other end 156 of the radius rod is pivotally connected to the bracket 38 that is welded to one of the chassis crossmembers 44.

The hanger assembly 28 positions the bearing assemblies 29 and 30 generally in a vertical line below the bracket 38, substantially parallel to the generally vertical line defined by the end 155 of the radius rod 36, the rear axle 14, and the bushing assembly 33. These substantially parallel vertical lines combine with the substantially parallel radius rod 36 and flat rod 35 to define a substantial parallelogram that restricts axle rotation.

As shown in FIG. 4, the shackle assembly 39 comprises a pair of plates 160 and 161 held apart by parts of the bearing assemblies 40 and 41. The bearing assembly 40 includes a shaft 162 having a head 163 on one end bearing against the plate 161. The other end 164 of the shaft 162 is welded to the plate 160. A metal sleeve 165 is rotatably mounted on the shaft 162. A rubber bushing 166 surrounds and is bonded to the metal sleeve 165. The rearward end 167 of the front leaf spring 23 is wound tightly about the rubber bushing 166.

The lower bearing assembly 41 comprises a shaft 169 having ahead 170 on one end bearing against the plate 161 and having its other end 171 welded to the plate 160. A metal sleeve 172 is rotatably mounted on the shaft 169. A rubber bushing 173 surrounds and is bonded to the metal sleeve 172. The forward end 174 of the rear leaf spring 34 is tightly wound about the rubber bushing 173.

FIGS. 7 through 10 illustrate a modified suspension assembly 190 designed for installation between the chassis 191 and the front and rear axles 192 and 193 of a vehicle. The suspension assembly 190 has a front axle subassembly 194 and a rear axle subassembly 195. The front axle subassembly has a hanger assembly 196 connected to and depending below the chassis 191. The hanger assembly 196 may be identical or substantially identical to the hanger assembly 17 and therefore will not be redescribed. The rear subassembly 19 has a hanger assembly 197 connected to and depending below the chassis 191. The hanger assembly 197 may be identical or substantially identical to the hanger assembly 28 and therefore will not be redescribed. The front subassembly 194 has a leaf spring assembly 200 and a lower pull rod 201. The rear subassembly 195 has a leaf spring assembly 202 and a lower pull rod 203.

In the front subassembly 194, two bushing assemblies 205 and 206 are mounted in the hanger assembly 196. The bushing assemblies 205 and 206 have the same components as the bushing assemblies 18 and 19, as the identical reference characters indicate. The rear hanger assembly 197 supports two bearing assemblies 209 and 210 that may be identical to the bearing assemblies 29 and 30, as the identical reference characters indicate.

A shackle assembly 212 comprises a metal housing 213 having a top wall 214 and sidewalls 215 and 216. A metal wear pad 217 is welded to the top wall 214 and is bowed downwardly. A stop lug 218 is welded to the sidewalls 215 and 216 and spans the space between them. Forwardly of the lug 218, a bolt 219 extends between the sidewalls 215 and 216.

A bearing assembly 222 is mounted between the sidewalls 215 and 216 of the housing 213. The bearing assembly 222 comprises a bolt 223 tightened in place by a nut 224. A metal sleeve 225 is rotatably mounted on the bolt 223. A rubber bushing 226 is bonded to the metal sleeve 225.

The forward ends 230 of the leaf springs of the spring assembly 200 are wrapped tightly about the rubber bushing 81 of the bushing assembly 205. Near its center, the leaf spring assembly 200 bears downwardly against a wear pad 231 that is welded to the top of the front axle 192. The rearward end 232 of the leaf spring assembly 200 bears upwardly against the wear pad 217. A short plate 233 is welded to the underside of the leaf spring assembly 200. The plate 233 has a downwardly extending lug 234 that projects between the lug 218 and the bolt 219 to restrict sliding movement of the spring 200 relative to the shackle assembly 212.

The forward ends 237 of the leaf spring assembly 202 are tightly wrapped about the rubber bushing 226 of the bushing assembly 222. Near its center, the leaf spring assembly 202 bears upwardly against the metal sleeve 137 of the bushing assembly 209. The rearward end 238 of the leaf spring assembly 202 bears downwardly against a wear pad 239 that is welded to the upper side of the rear axle 193.

The pull rod 201 is connected to the axle 192 through an axle seat 242 and U-bolts 243 in a manner known in the art. The front end 244 of the pull rod 201 is a tightly wrapped about the rubber bushing 94 of the bushing assembly 206.

The pull rod 203 is connected to the rear axle 193 through an axle seat 245 and U-bolts 246 and its front end 247 is tightly wrapped about the rubber bushing 146 of the bushing assembly 210.

OPERATION

In the suspension assembly 11 of FIGS. 1–9, excessive loads applied to either axle 13 or 14 are partially distributed to the other axle. For example, if an excessive load is applied upwardly to the axle 13, the excessive load is resisted by the leaf spring 23. In addition, the excessive load tends to swing the leaf spring 23 upwardly about the bearing assembly 18, applying an upward pressure to the shackle assembly 39. This applies an upward force on the end 174 of the leaf spring 34, tending to swing the leaf spring 34 about its fulcrum bearing against the bearing assembly 29 and tending to lower the rearward end 142 of the leaf spring 34. Since the rearward end 142 of the leaf spring 34 bears downwardly against the base 138 of the spring retainer 32, the result is a downward force applied against the axle 14, thus distributing a portion of the excessive load that was applied to the front axle 13.

As the front axle moves vertically up or down, the leaf spring 23 is free to slide within the leaf spring guide 21. The aforementioned substantial parallelogram prevents any significant rotation of the axle 13.

As the axle 14 moves up or down vertically, the loop 142, as restrained by the bolt 141, permits the leaf spring 34 to slide relative to the axle 14. The aforedefined parallelogram prevents any significant rotation of the rear axle 14.

The operation of the suspension assembly 190 is similar to that of the suspension assembly 11 except that the suspension assembly 190 eliminates the radius rods 25 and 36. Otherwise, loads are distributed between the axles 192 and 193 in the same manner as they are distributed between the axles 13 and 14.

In both suspension assemblies, the hanger assemblies 17, 28, 196 and 197 permit vertical adjustment of the suspension assemblies to accommodate different axle heights. Also, the bolts 88 and 140 of the bearing assemblies 19, 30, 206 and 210 permit axle alignment, because when any one of the bolts is rotated, it adjusts the longitudinal position of the axle associated with it.

What is claimed is: 1. A vehicle suspension assembly for a vehicle having a chassis and front and rear axles comprising front and rear hanger assemblies depending from the vehicle chassis, a shackle assembly, a front leaf spring extending between the front hanger assembly and the shackle assembly, a rear leaf spring extending between the rear axle and the shackle assembly, the front leaf spring having a part between the front hanger assembly and the shackle assembly bearing downwardly against the front vehicle axle, a spring guide between the front axle and the part of the front leaf spring bearing thereon to permit relative longitudinal sliding movement between the front leaf spring and the front axle, a bearing means supported by the rear hanger assembly, the rear leaf spring having an area between the rear axle and the shackle assembly bearing upwardly against the bearing means supported by the rear hanger assembly, and a pull rod pivotally connected between the front hanger assembly and the front axle.

2. The vehicle suspension assembly of claim 1 1 hanger assemblies have vertically spaced bearings, the leaf springs bearing against the upper bearings, the rod being pivotally connected to the lower bearing.

3. The vehicle suspension assembly of claim 1 including a front radius rod pivotally connected between the front axle and the vehicle chassis, the front radius rod being substantially parallel to the front pull rod.

4. The vehicle suspension assembly of claim 1 including means to restrict longitudinal movement and upward movement of the front leaf spring relative to the shackle assembly, and means pivotally connecting the rear leaf spring to the shackle vertically below the said restricting means.

5. The vehicle suspension assembly of claim 4 wherein the front leaf spring is pivotally connected to the shackle assembly.

6. The vehicle suspension assembly of claim 4 wherein the shackle assembly has a horizontal wear pad, the wear pad bearing against the top of the front leaf spring.

7. The vehicle suspension assembly of claim 1 including means between the rear axle and rear leaf spring allowing restricted longitudinal movement of the rear leaf spring relative to the rear axle.

8. The vehicle suspension assembly of claim 7 including a pull rod pivotally connected between the rear axle and the rear hanger assembly.

9. The vehicle suspension assembly of claim 8 including a front radius rod pivotally connected between the front axle and the vehicle chassis, a rear radius rod pivotally connected between the rear axle and the vehicle chassis, the front radius rod being substantially parallel to the front pull rod, and the rear radius rod being substantially parallel to the rear pull rod.

10. A vehicle suspension assembly for a vehicle having a chassis and front and rear axles comprising front and rear hanger assemblies depending from the vehicle chassis, a shackle assembly, a front leaf spring extending between the front hanger assembly and the shackle assembly, a rear leaf spring extending between the rear axle and the shackle assembly, the front leaf spring having a part between the front hanger assembly and the shackle assembly bearing downward against the front vehicle axle, a bearing means supported by the rear hanger assembly, the rear leaf spring having an area between the rear axle and the shackle assembly bearing upwardly against the bearing means supported by the rear hanger assembly, a pull rod pivotally connected between the front hanger assembly and the front axle, a pull rod pivotally connected between the rear axle and the rear hanger assembly, a front radius rod pivotally connected between the front axle and the vehicle chassis, and a rear radius rod pivotally connected between the rear axle and the vehicle chassis, the front radius rod being substantially parallel to the front pull rod, and the rear radius rod being substantially parallel to the rear pull rod.

11. A vehicle suspension assembly for a vehicle having a chassis and front and rear axles comprising front and rear hanger assemblies depending from the vehicle chassis, a shackle assembly, a front leaf spring extending between the front hanger assembly and the shackle assembly, a rear leaf spring extending between the rear axle and the shackle assembly, the front leaf spring having a part between the front hanger assembly and the shackle assembly bearing downwardly against the front vehicle axle, a bearing means supported by the rear hanger assembly, the rear leaf spring having an area between the rear axle and the shackle assembly bearing upwardly against the bearing means supported by the rear hanger assembly, means between the rear axle and the rear leaf spring for allowing restricted longitudinal movement of the rear leaf spring relative to the rear axle, and a pull rod pivotally connected between the rear axle and the rear hanger assembly.

12. The vehicle suspension assembly of claim 11 wherein the means for allowing restricted horizontal movement includes a slightly arcuate slot at the end of the rear leaf spring where the rear axle connects, and means connected to the rear axle and slideably engaged within the slot to provide the restricted longitudinal movement.